Nov. 13, 1951 M. RETTINGER 2,574,708

VIBRATILE PICKUP FOR MAGNETIC RECORDERS

Filed Dec. 22, 1948

MICHAEL RETTINGER,
INVENTOR.

BY [signature]

ATTORNEY

Patented Nov. 13, 1951

2,574,708

UNITED STATES PATENT OFFICE 2,574,708

VIBRATILE PICKUP FOR MAGNETIC RECORDERS

Michael Rettinger, Encino, Calif., assignor to Radio Corporation of America, a corporation of Delaware Application December 22, 1948, Serial No. 66,792

7 Claims. (Cl. 179—100.2)

This invention relates to sound reproduction, and particularly to the reproduction of sound from a magnetic record, either standard or push-pull.

In the recording of sound on, and the reproduction of sound from magnetic mediums, such as coated film, tape, or magnetic wire, the usual method and equipment used for detecting the sound record is a magnetic head of the type employed for recording. That is, such a head comprises essentially a laminated core having one or more gaps therein and a winding around the core. By passing the magnetic record across the gap in the reproducing head, the magnetic field is varied, introducing a voltage into the winding which is amplified and converted into sound waves. Thus, detection is obtained by induction which will provide a response which increases with frequency at the rate of six (6) db per octave. Therefore, to provide a flat frequency response, it is necessary to equalize the output of the reproducing head which reduces, to a large extent, the efficiency of detection.

The present invention is directed to a detection system for a magnetic sound track which has a substantially flat frequency response characteristic and which utilizes a capacity variation obtained by the movements of an element adjacent to the sound track which may or may not be in the form of a magnet. By the use of an oscillator-discriminator detecting circuit, linear variations in capacity are translated into linear voltage variations with minimum distortion. By using a stretched steel ribbon instead of a mechanical lever, the actuating ribbon may be tuned to a frequency outside of the range of signal frequencies, and thus, the amplitude of the ribbon will be constant with frequency and avoid the distortion of an induction type detector.

The principal object of the invention, therefore, is to facilitate the detection of a magnetic sound record.

Another object of the invention is to provide an improved reproducing system for magnetic sound records.

A further object of the invention is to provide an improved system for detecting and translating into current variations the magnetic variations in a magnetic sound record.

A still further object of the invention is to provide a magnetic sound reproducing system which has a linear frequency response characteristic.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
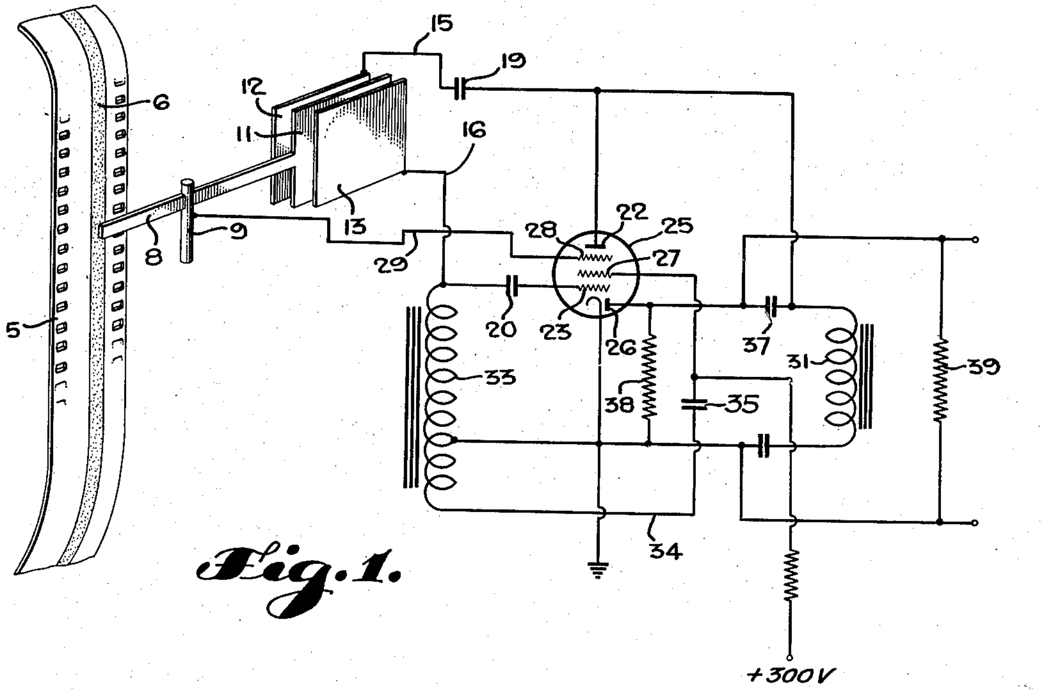
Fig. 1 is one modification of the invention showing the detecting circuit.

Referring now to the drawings, in which the same numerals identify like elements, a magnetic tape or film 5 has a magnetic record 6 thereon, the film or tape being advanced at a uniform speed in any suitable manner not shown. An armature or lever 8 of ferromagnetic material is pivoted at 9 and has one end immediately adjacent the magnetic record 6 and the other end in the form of a plate 11 positioned between two fixed electrodes 12 and 13. The end of the lever 8 adjacent the track may or may not be polarized; that is, form one pole of a magnet. With this construction, the lever 8 will vibrate about the point 9 in accordance with the strength of the magnetism in the record 6, thus vibrating the plate 11 between the plates 12 and 13.

To detect these vibrations, the plates 11, 12, and 13 are connected to an oscillator-discriminator detecting circuit, such as is used in Badmaieff U. S. Patent No. 2,423,285 of July 1, 1947. To describe briefly the oscillator-discriminator circuit, the plates 12 and 13 are connected over conductors 15 and 16, respectively, and blocking condensers 19 and 20 to the anode 22 and the grid 23 of a vacuum tube 25, such as a 6SF7, or similar type having a diode 26, an oscillator-anode 27, and suppressor grid 28, to which plate 11 is connected over conductor 29. The auxiliary diode 26 of tube 25 cooperates with the cathode of the tube to provide the necessary rectification, the suppressor grid 28 acting as an electro-static shield for the grid 27 and the other elements. The anode 22 is also connected to a discriminator coil 31 for the purpose of varying the resonance of this coil. The voltage variation impressed on the grid 23 varies the frequency of the generated high frequency current, the voltage variations on grid 23 and those on discriminator coil 31 being 180 degrees out-of-phase. In this oscillator-discriminator circuit, the screen grid 27 functions as an oscillator plate and feeds into the lower part of a coil 33 over conductor 34 and blocking condenser 35 which couples the oscillator-anode 27 to the oscillator tank circuit. The output energy from anode 22 is fed to diode 26 by means of a coupling condenser 37. Resistor 38 is the detector load resistor which may be supplemented by resistor 39, an amplifier and loud speaker being connected to the output terminals.

The above described system, therefore, avoids the velocity effect distortion of six (6) db per octave, since the linear mechanical motion is translated into linear capacity variations instead of variations in inductance. Thus, the average efficiency is increased.

Figure 2:
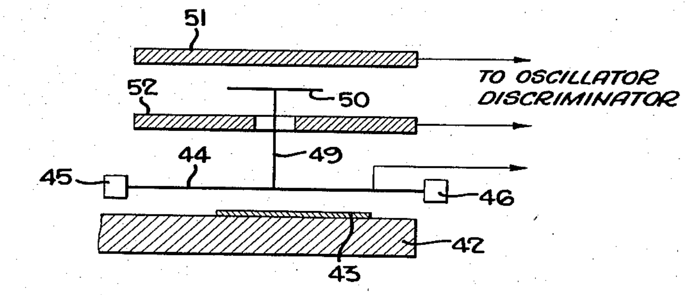
Fig. 2 is a detailed drawing of the detecting elements of the reproducing system for a standard record.
Figure 3:
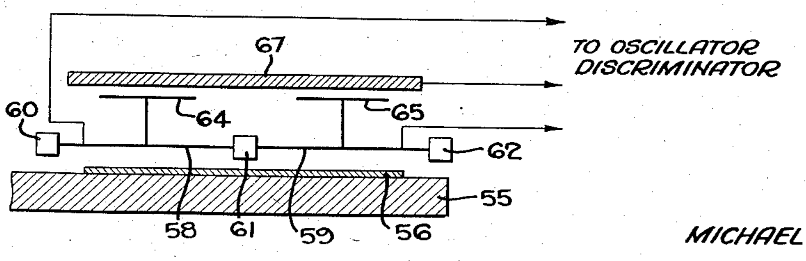
Fig. 3 is a view of the detecting elements for a push-pull type of magnetic sound record.

Referring now to Fig. 2, a type of system is shown wherein the resonant frequency of the mechanical element is outside the range of signal frequencies to be detected. In this detector unit, a film 42 has thereon a magnetic track 43 which is advanced adjacent a stretched steel ribbon 44 which is ferromagnetic and mounted in supports 45 and 46. Mounted at the center of the ribbon 44 is a rod 49 on which is a diaphragm 50, the diaphragm being positioned between two fixed electrodes 51 and 52. Therefore, variations of the ribbon 44 will cause the diaphragm 50 to move to various positions between the electrodes, and thus, provide capacity variations to the tube 25 to which these elements may be connected in the same manner as shown in Fig. 1. That is, stationary electrodes 51 and 52 will be connected to anode 22 and grid 23 and the diaphragm 50 to grid 28.

To reproduce a push-pull track, a film 55 having thereon a magnetic record 56 of the push-pull type; that is, one wherein an increase in magnetism at one point is accompanied by a decreased magnetism transversely opposite, is shown in position adjacent two ribbons 58 and 59 between mounts 60, 61, and 62. A diaphragm 64 is mounted on ribbon 58 and a diaphragm 65 is mounted on ribbon 59, similarly to diaphragm 50 in Fig. 2.

In this modification, a single fixed electrode 67 is provided, the diaphragms 64 and 65 being both on one side thereof. Thus, when ribbon 59 is urged away from the record, ribbon 58 will be urged toward the record, so that as the capacitance is increased between diaphragm 64 and plate 67, the capacitance between diaphragm 65 and plate 67 is simultaneously decreased.

Thus, in each case, detection is obtained by varying the frequency of the oscillating portion of the detector circuit to provide frequency modulation detection which overcomes the velocity effect distortion of the usual type of magnetic detection heads, and which will provide a maximum in sensitivity, stability, and accuracy in detecting the small variations in magnetism in the sound record. By placing the electrode 67 adjacent the ribbons 58 and 59, the diaphragms 64 and 65 may be eliminated, although this construction will not be as distortion-free as the arrangement shown.

I claim:

1. A magnetic sound record reproducing system, comprising a ferromagnetic ribbon, means for advancing a magnetic record in a fixed plane past said ribbon, means for mounting a diaphragm on said ribbon, capacitance means positioned adjacent said diaphragm, said diaphragm and capacitance means having flat surfaces spaced from and parallel to one another, an oscillator-discriminator circuit, and means for connecting said diaphragm and capacitance means to said oscillator-discriminator circuit to translate variations in motion of said ribbon toward and away from said record into electrical currents having a linear relationship with respect to the variations in magnetism in said record.

2. A magnetic sound record detecting system, comprising an oscillator-discriminator circuit, means for advancing a magnetic sound record, a pair of ferromagnetic ribbons disposed transversely of said record and past which said record is advanced, a fixed electrode, diaphragms positioned adjacent said electrode and connected to said ribbons, said electrodes and diaphragms having flat surfaces spaced from and parallel with one another, movement of said ribbons and said diaphragms being in a push-pull relationship, and means for connecting said diaphragms and said electrode to said oscillator-discriminator circuit.

3. A magnetic sound record detecting system, comprising an oscillator-discriminator circuit, means for advancing a magnetic sound record, a ferromagnetic element having a flat surface portion and past which said sound record is advanced, said element being movable toward and away from said record in accordance with the variations in magnetism in said sound record as said record is advanced past said element, fixed electrodes having flat surfaces spaced from and parallel with the flat surface of said element, and means connecting said movable element and said fixed electrodes to said oscillator-discriminator for varying the frequency of said oscillator in accordance with the movements of said element whereby a linear relationship between the variations in magnetism in said record and the output of said oscillator-discriminator is obtained.

4. A magnetic sound record reproducing system, comprising an oscillator-discriminator circuit, ferromagnetic vibratable means adapted to be vibrated by variations in magnetism of a magnetic record advanced past said means, the vibrations of said means being toward and away from said record, fixed capacitance means on at least one side of said vibratable means, said capacitance means and vibratable means having flat surfaces spaced from and parallel with each other, and means for connecting said vibratable means and said capacitance means to said oscillator-discriminator circuit, vibrations of said vibratable means varying the frequency of the currents generated by said oscillator and providing a linear relationship between the variations in magnetism in said record and the output of said oscillator-discriminator circuit.

5. A magnetic sound record reproducing system in accordance with claim 5, in which said vibratable means is a plate having a flat surface portion and said capacitance means is a fixed electrode having a flat surface; said flat surfaces being parallel and spaced from each other.

6. A magnetic sound record reproducing system in accordance with claim 4, in which said vibratable means is a ferromagnetic tensioned ribbon having a diaphragm attached thereto and said capacitance means is at least one fixed electrode, said diaphragm and capacitance means having flat surfaces, said diaphragm being positioned, adjacent said electrode with their flat surfaces parallel and spaced apart.

7. A magnetic sound record reproducing system in accordance with claim 4, in which said vibratable means is a pair of ferromagnetic tensioned ribbons having diaphragms attached thereto and said capacitance means is a fixed electrode adjacent said diaphragms, said diaphragms having flat surfaces in a certain plane and said capacitance means having a flat surface spaced from and parallel with the flat surface of said diaphragm.

MICHAEL RETTINGER.

REFERENCES CITED

The following references are of record in the file of this patent:

UNITED STATES PATENTS

| Number | Name | Date |
|---|---|---|
| 831,779 | Emerson | Sept. 25, 1906 |
| 1,656,216 | Melby | Jan. 17, 1928 |
| 2,445,990 | Badmaieff | July 27, 1948 |